(12) United States Patent
Yasuda

(10) Patent No.: US 6,594,569 B2
(45) Date of Patent: Jul. 15, 2003

(54) DEVICE AND METHOD FOR SETTING STEERING CHARACTERISTICS OF ELECTRIC POWER STEERING

(75) Inventor: Akio Yasuda, Kosai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/072,952

(22) Filed: Feb. 12, 2002

(65) Prior Publication Data

US 2002/0143449 A1 Oct. 3, 2002

(30) Foreign Application Priority Data

Mar. 30, 2001 (JP) .................................. 2001-100499

(51) Int. Cl.[7] .............................................. G06F 7/00
(52) U.S. Cl. ......................... 701/41; 701/42; 180/443; 180/446
(58) Field of Search ................... 701/41, 42; 180/443, 180/444, 445, 446

(56) References Cited

U.S. PATENT DOCUMENTS 4,946,001 A * 8/1990 Taniguchi et al. ............ 701/41
6,129,172 A * 10/2000 Yoshida et al. ............. 180/446
6,148,948 A * 11/2000 Shimizu et al. ............. 180/446
6,152,255 A * 11/2000 Noro et al. .................. 180/446

FOREIGN PATENT DOCUMENTS

JP          A-2000-108918          4/2000

* cited by examiner

Primary Examiner—Gertrude Arthur
(74) Attorney, Agent, or Firm—Posz & Bethards, PLC

(57) ABSTRACT

The optimum value of steering feelings in operating an electric power steering system depends on a vehicle model, changes in vehicle model characteristics, payload and driving conditions by secular changes, and the driver's preferences. A steering characteristics diagram selected by a steering characteristics diagram selection means is compiled by the use of a mouse on a display in accordance with a driver's tastes and tendencies, and vehicle driving conditions. An EPS (electric power steering) controller and an EPS driving motor are controlled by the steering characteristics diagram thus compiled, thereby assisting the steering operation. A driver can grasp the necessary amount of compilation as an intuitive amount while observing the steering characteristics diagram on a display. The driver may easily and rapidly reset a variety of steering feelings suited to the driver's personality in accordance with his tastes and tendencies, and the vehicle driving conditions.

30 Claims, 6 Drawing Sheets

DEVICE AND METHOD FOR SETTING STEERING CHARACTERISTICS OF ELECTRIC POWER STEERING

CROSS REFERENCE TO RELATED APPLICATION

This application is based on and incorporates herein by reference Japanese Patent Application No. 2001-100499 filed on Mar. 30, 2001.

BACKGROUND OF THE INVENTION

1. Field of the Invention

The present invention relates to an electric power steering system that transmits power from an electric motor to a steering system to reduce a required steering force, and more particularly, to a device and method for setting steering characteristics of the electric power steering system that compiles steering characteristics in accordance with a driver's personal preferences.

2. Description of Related Art

An electric power steering system has been disclosed in the prior art as JP-A No. 2000-108918. In this electric power steering system, an angular difference in slip between front and rear wheels of a vehicle is computed for estimation on the basis of a yaw rate signal, steering angle signal, vehicle speed signal, and wheel base. Understeer correction value, oversteer correction value, and counter steer correction values are determined in accordance with the estimate, and a correction signal is generated after correction of a target torque signal on the basis of the correction values.

A correction value for the correction signal can be compiled by multiplying the correction value by a switching means. For this compilation a plurality of correction mode selection keys are provided to select the correction modes suitable for the driver's driving skill, thereby realizing a steering feeling satisfactory to drivers of different levels of driving skill.

The mode selection system of this electric power steering system, however, is capable of selecting, at most, three to five kinds of modes, and therefore has the disadvantage that delicate characteristics selected will not necessarily suit a driver's personal preferences. That is, the optimum value of the steering feeling of the electric power steering varies with vehicle model, and vehicle model characteristics depend upon a change of time, payload, driving conditions according to driving purpose, and a driver's individual characteristics such as age and sex. Only the assist of the motor for reducing the steering force is controlled and, therefore, it is hard to gain a good steering feeling.

Therefore, to gain a good steering feeling, it is necessary to comprehensively adjust an assist characteristic, a disabling characteristic, and a damper characteristic. These characteristics are shown by a line graph having at least approximately seven or eight-point elements. There is, therefore, no easy-to-adjust means for drivers in general.

SUMMARY OF THE INVENTION

In view of the above-described disadvantages, it is an object of this invention to provide a device and method for setting steering characteristics of an electric power steering system that is capable of grasping the necessary amount of compilation data as an intuitive or sensorial amount while observing the steering characteristics diagram, and altering and compiling the steering characteristics based on the steering characteristics diagram. It therefore becomes possible for a driver to easily and quickly reset the steering characteristics to varied steering feelings agreeable to the driver's individual characteristics in accordance with the driver's preferences and vehicle driving conditions.

In the device for setting the steering characteristics of the electric power steering, a plurality of steering characteristics diagrams prepared in relation to the steering conditions are selected by the steering characteristics diagram selection means. The compilation of the steering characteristics is performed on the steering characteristics diagram while observing the steering characteristics diagram in order to achieve the optimum steering feeling in accordance with a driver's tastes and tendencies, and driving conditions of a vehicle. The steering characteristics diagram thus compiled is stored and then read in to generate a driving signal. The electric power steering driving motor is controlled by the driving signal, thereby assisting steering operation. The steering characteristics diagram, as described above, is compiled so as to achieve the optimum steering feeling in accordance with the driver's tastes and tendencies and driving conditions of the vehicle from default characteristics at the time of purchase.

The driver, therefore, can ascertain the necessary amount of compilation as an intuitive or sensorial amount by observing the steering characteristics diagram. The driver can easily and quickly reset various steering feelings suitable to the driver's individual characters in accordance with his tastes, tendencies, and vehicle driving conditions.

The steering characteristics diagram includes a diagram showing a relationship between the steering torque and the assist current, a diagram showing a relationship between the steering wheel steering angle and the assist current, and a diagram showing a relationship between the angular velocity of the steering wheel and the assist current. The optimum steering feeling suited to a driver's varied individual characteristics can be precisely set through the compilation of each of these diagrams.

The steering characteristics diagram display means is a diagram display screen or similar device. The steering characteristics diagram compilation means is a device capable of compiling, by the driver's operation, the steering characteristics diagram on the diagram display screen. This device functions to read the compiled steering characteristics diagram by the steering characteristics diagram reading means. It is, therefore, possible to carry out the compilation on the diagram display screen while observing the steering characteristics diagram.

The device is a pointing device, which changes a position by touching an endpoint of the steering characteristics diagram displayed on the diagram display screen. It is, therefore, possible for the driver to intuitively grasp, compile and recognize the amount of compilation. The pointing device, capable of compiling the steering characteristics diagram, includes a mouse, a trackball, a touch pad, and a touch panel, but may include other types of input devices. Using the pointing device, it is possible to extend, shorten, and move a line between endpoints in the steering characteristics diagram by touching and moving the endpoints by the mouse point, thus intuitively grasping the amount of compilation.

For the compilation of the steering characteristics diagram, there is provided a disabling means for disabling the compiling operation in case the operation goes out of the predetermined normal range of compilation. Therefore, it is possible to prevent abnormal steering without overcompilation exceeding a proper range in the steering characteristics diagram resulting from the driver's mistake or misoperation.

The steering characteristics diagram display means and the steering characteristics diagram compilation means are built in such vehicle-mounted products as a car navigation system and a TV, separately from the electric power steering. It is, therefore, unnecessary to separately provide a special member for the compilation of the steering characteristics diagram. Since no special member is separately needed and existing members are usable, the interior space of the vehicle is not required to be reduced, which is advantageous in cost as well.

The steering characteristics diagram display means and the steering characteristics diagram compilation means can be wirelessly linked with the electric power steering driving motor control means. The steering characteristics diagram, therefore, can be remotely controlled in advance for display and compilation from outside the vehicle, e.g., from a driver's home or office.

By the method for setting the electric power steering characteristics, a plurality of steering characteristics diagrams prepared in relation with the steering conditions are selected and the steering characteristics diagrams thus selected by the steering characteristics diagram selection means are displayed. The driver can execute compilation on the steering characteristics diagram while observing the diagram so as to achieve the optimum steering feeling in accordance with personal tastes and tendencies and the driving conditions of the vehicle. The steering characteristics diagram thus compiled is stored, and then is read out of storage. A driving signal is generated on the basis of the steering characteristics diagram read out, so that controlling the electric power steering driving motor which assists the steering operation can be accomplished.

The steering characteristics diagram, as described above, is compiled to gain the optimum steering feeling, from the default characteristics at the time of purchase, in accordance with the driver's tastes, tendencies and the driving conditions of the vehicle.

The means for displaying the steering characteristics diagram is a diagram display screen. The steering characteristics diagram compilation means is a device capable of compiling the steering characteristics diagram on the diagram display screen by the driver's operation. This device functions to operate the steering characteristics diagram reading means to read the diagram after compilation, thereby enabling the compilation of the steering characteristics diagram on the diagram display screen while observing it. The device may be a pointing device, which changes a position by touching end points of the steering characteristics diagram displayed on the diagram display screen. It is, therefore, possible for the driver to intuitively recognize the amount of compilation while sensorially grasping the amount of compilation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENTS

The following description of the preferred embodiments is merely exemplary in nature and is in no way intended to limit the invention, its application, or uses. Preferred embodiments of a device and method for setting steering characteristics of an electric power steering are explained with reference to the accompanying drawings.

Figure 1:
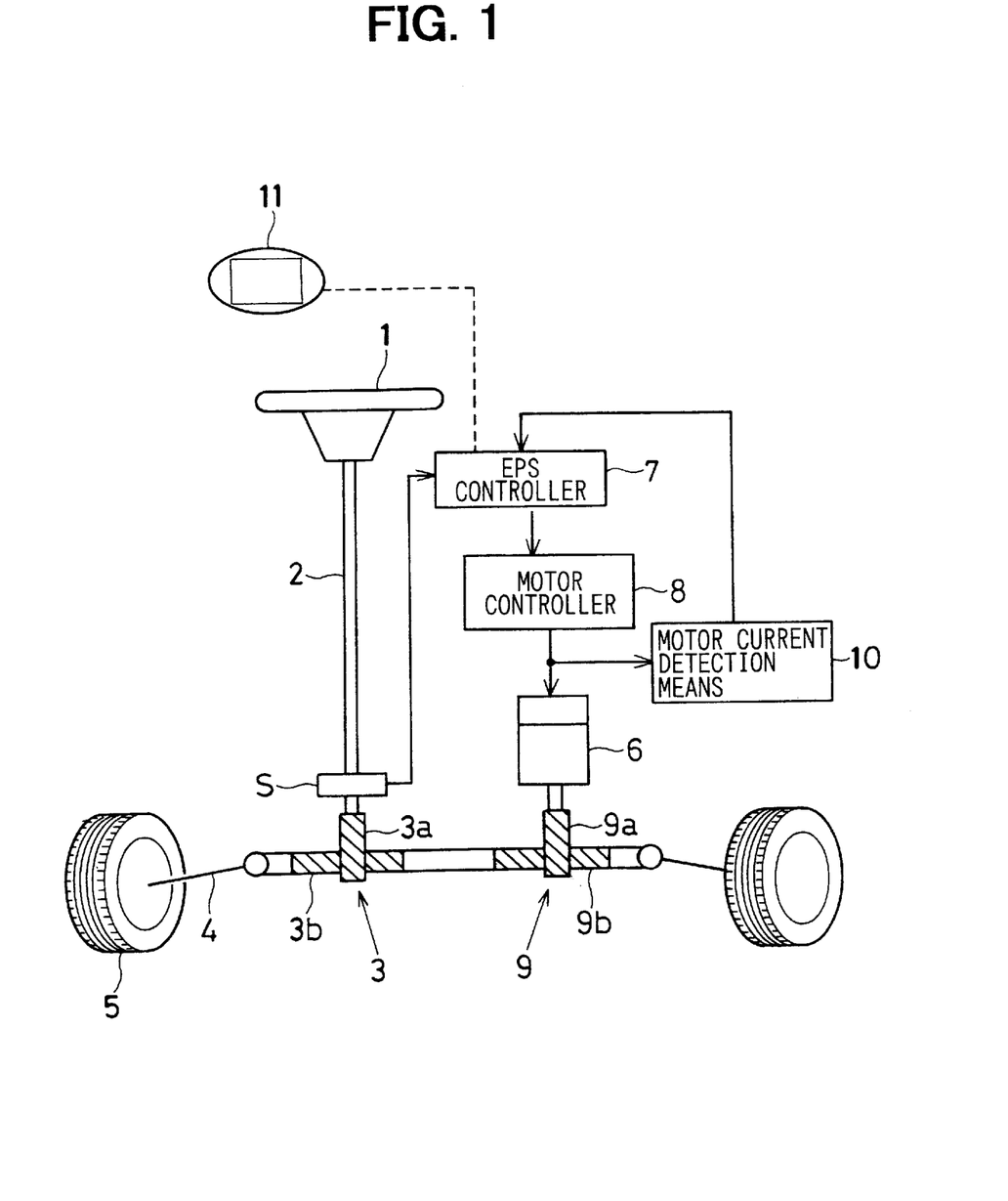
FIG. 1 is a schematic view of an electric power steering system according to an embodiment of the present invention.

FIG. 1 schematically shows an electric power steering (EPS) system where the steering force of a steering wheel 1 is transmitted to a rack and pinion mechanism 3 through a steering shaft 2. The rotational force that a pinion 3a receives changes into a linear motion in the direction of an axis of a rack 3b, thereby changing the direction of travel of front wheels 5 through a tie rod 4.

At this time, an EPS driving motor 6 is supplied with current through a control means such as an EPS controller 7 and a motor controller 8 corresponding to a driving signal fed from a steering torque sensor S for the purpose of manually assisting the steering torque. Then, the torque from the EPS driving motor 6 is transmitted to an auxiliary rack and pinion mechanism 9. The rotational force that a pinion 9a receives changes to a linear motion in the direction of an axis of a rack 9b, acting on the steering shaft 2 to reduce the steering force. In this case, a motor current detection means 10 detects and converts motor current into voltage, then feeds back (negative feed) a motor torque signal corresponding to the motor current to the EPS controller 7.

Figure 2:
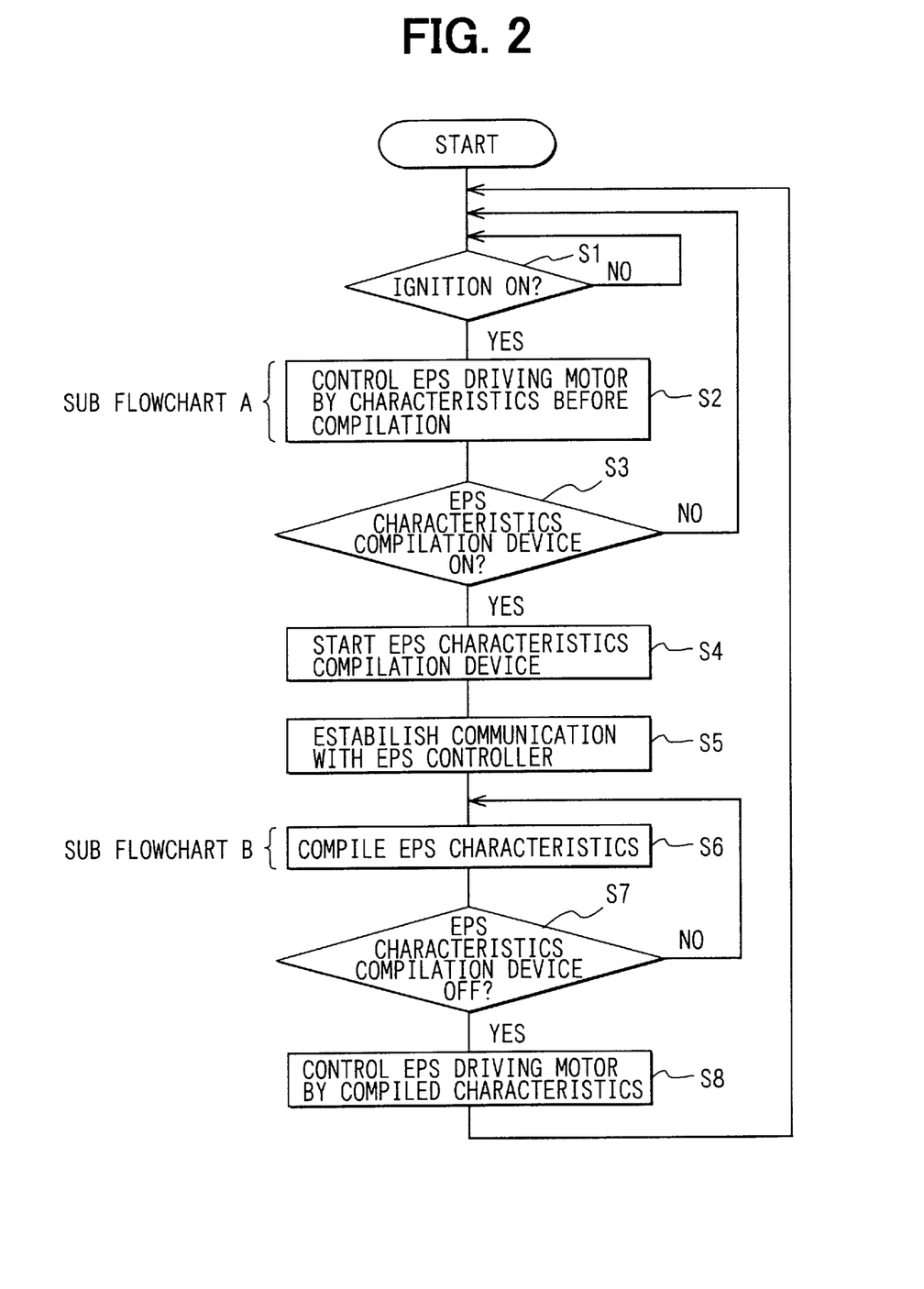
FIG. 2 is a main flowchart for compilation of a steering characteristics setting device for an electric power steering system in an embodiment of the present invention.

FIG. 2 is a main flowchart showing a method for setting the steering characteristics setting device (EPS characteristics compiling device) of the electric power steering in the EPS controller 7. At Step S1, whether or not the engine of the vehicle has been started by ignition is determined. When the engine remains unstarted, the program returns to Step S1. When the engine starts, the program proceeds to Step S2, where the EPS driving motor 6 is controlled by steering characteristics prior to compilation as shown in the later-described subflowchart A.

At Step S3, it is determined whether or not the EPS characteristics compiling device is on and being used. When the compiling device is not on and being used, the program returns to Step S1. When the compiling device is used, the program proceeds to Step S4, where the EPS characteristics compiling device is started. When the compiling device is started, communications with the EPS controller 7 are established by the use of a personal computer at Step S5. After the establishment of the communications, the EPS characteristics are compiled at Step S6 as shown in subflowchart B described below.

After compilation, at Step S7, it is determined whether or not the EPS characteristics compiling device is turned off. When the device is not off, the program returns to Step S6. When the device is off, the EPS driving motor 6 is controlled in accordance with the compiled steering characteristics at Step S8.

Figure 3:
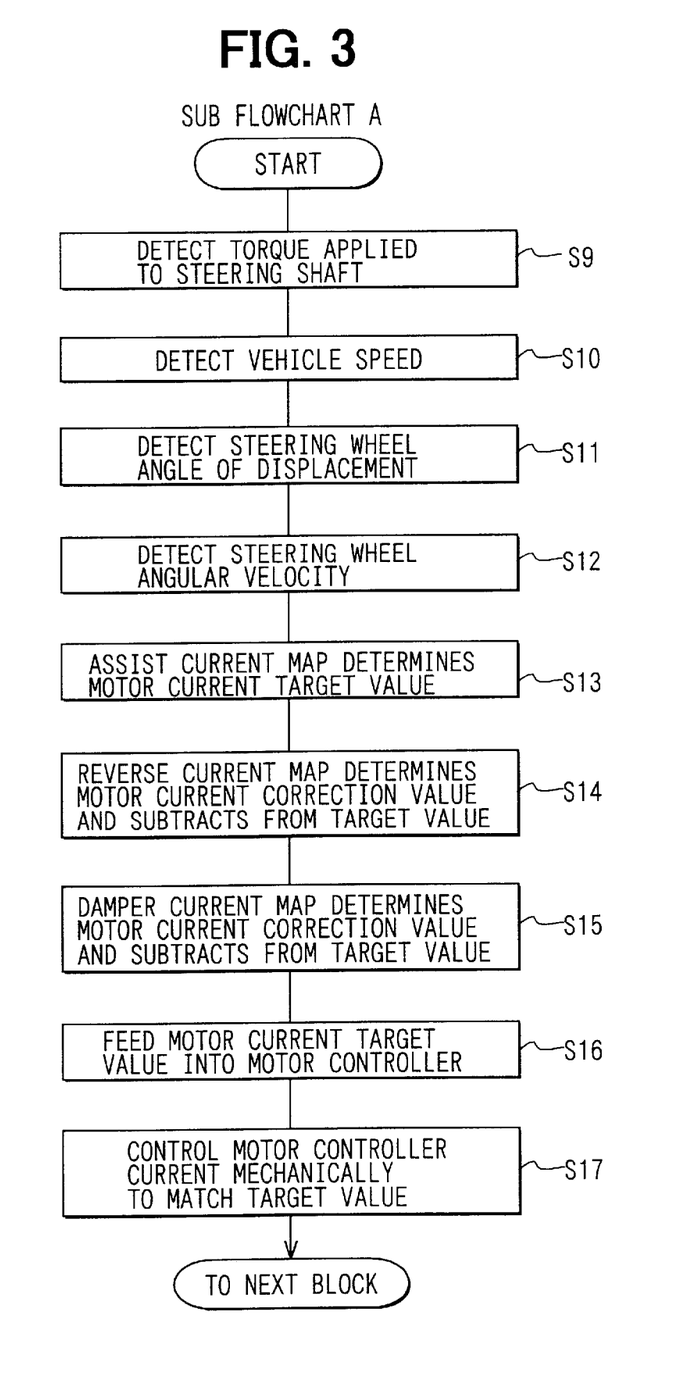
FIG. 3 is a subflowchart for compilation of a steering characteristics setting device for an electric power steering system in an embodiment of the present invention.

In the subflowchart A at Step S2, a torsional torque to be applied to the steering shaft 2 is detected by means of the steering torque sensor S at Step S9 as shown in FIG. 3. At Step S10 the vehicle speed is detected. At Step S11 a displacement angle from the neutral position of the steering wheel 1 is detected. At Step S12, an angular velocity of rotation of the steering wheel is detected. At Step S13, the target value of the motor current, which is commensurate with the detected torsional torque and vehicle speed, is determined from the assist current map.

At Step S14, the correction value of the current supplied to the motor which is commensurate with the displacement angle of the steering wheel 1 and the vehicle speed detected is determined by referring to the reverse current map, and is subtracted from the target value of motor current. At Step S15, the correction value of the motor current which is commensurate with the turning angle speed (angular velocity) of the steering wheel 1 and the vehicle speed detected is determined from the damper current map, to thereby subtract the correction value from the target value of the motor current. At Step S16, the target value of the motor current is sent to the motor controller 8; and then at Step S17 the motor controller 8 controls the electric current so that the value of the motor current will match the target value.

Figure 4:
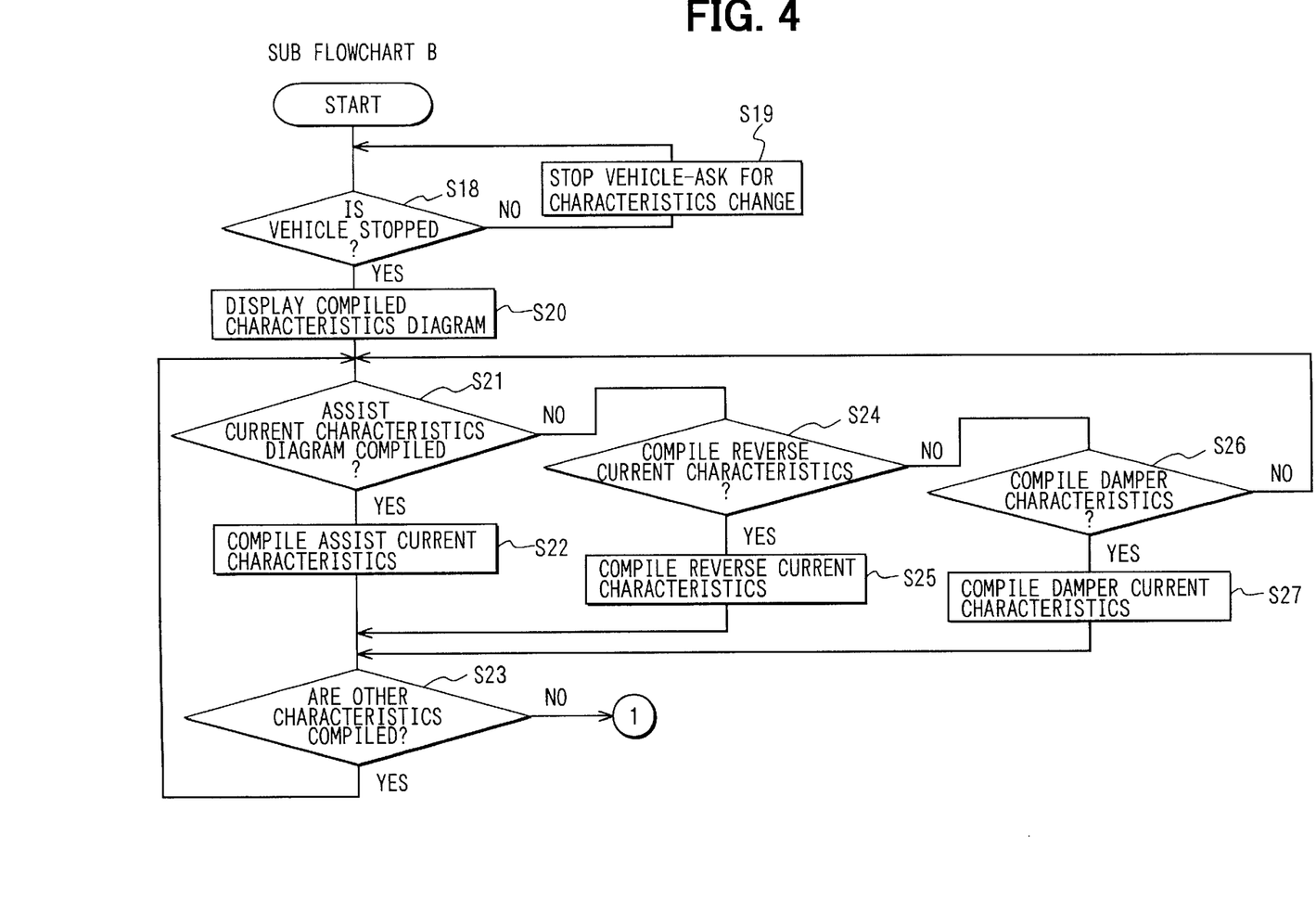
FIG. 4 is a subflowchart for compilation of a steering characteristics setting device for the electric power steering system in an embodiment of the present invention.

In the subflowchart B at Step S6, it is determined whether or not the vehicle is stopped at Step S18 as shown in FIG. 4. When the vehicle is not stopped, a message is sent to continue a change in steering characteristics after the stop of the vehicle at Step S19. When the motor is at a stop, an image of selected and compiled characteristics regarding steerability is displayed on the display D (an EPS control characteristics input means as an electronic input means) of the personal computer at Step S20.

The electronic input means is for inputting the steering characteristics into the EC for the EPS, including a wire or wireless communications means to enable information transmission to and reception from the ECU. The simplest method is the provision of a connector, for connection of the electronic input means with an existing cable (LAN in a certain sense) built inside the vehicle, to connect to the ECU for the EPS.

The electronic input means is sometimes used as an information input means for inputting information from an ancillary product as a car navigation system.

At Step S21, it is determined whether or not the assist current characteristics (a map showing a relationship between the assist current and the steering torque) is compiled by the use of the steering characteristics diagram selection means. When the characteristics are compiled, the compilation of the assist current characteristics is effected at Step S22.

Figure 5:
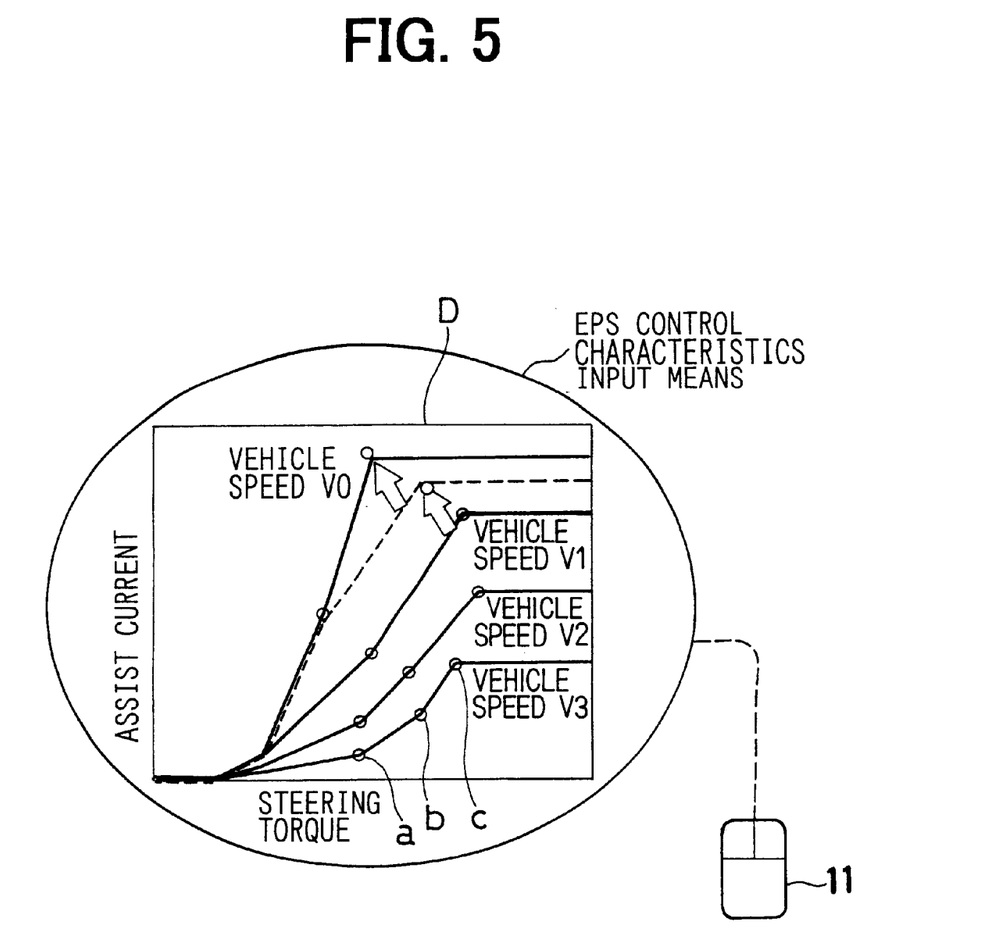
FIG. 5 is a steering characteristics diagram displayed on a display screen of a personal computer in an embodiment of the present invention.

In this case, while observing the assist current characteristics diagram (a line graph) displayed on the display D of the personal computer as shown in FIG. 5, a mouse 11 as a pointing device is operated to point the mouse cursor to the endpoints a, b and c of a line of the assist current characteristics line graph. In this state, with the movement of the mouse cursor, the line between the endpoints a, b and c is changed in length and position like a rubber band, changing as indicated by an arrow in FIG. 5.

For example, to set light steering wheel manipulation during a stop of the vehicle, the line of the assist current characteristics at a vehicle speed of 0 km/h is pulled upward on the display D. Also to increase the steering wheel reaction force, the rising position of the electric current is moved to the right.

After the compilation (change) of the assist current characteristics diagram, it is determined whether or not other characteristics related to steering are compiled at Step S23. For compilation, the program returns to Step S21.

When no compilation is effected of the assist current characteristics at Step S21, it is determined at Step S24 whether or not the reverse current characteristics (the map indicating a relationship between the steering angle of the steering wheel and the assist current) are to be compiled. When the characteristics need compilation, the compilation of the reverse current characteristics is performed at Step S25.

In compiling the reverse current characteristics, the endpoints of the reverse current characteristics diagram (line graph) displayed on the display D of the personal computer are changed in position by extending or shortening the line similarly to FIG. 5. After the compilation (change) of the reverse current characteristics diagram, it is determined whether or not the other characteristics relative to steering were compiled at Step S23. When compiling, the program returns to Step S21.

When no compilation is effected of the reverse current characteristics diagram at Step S24, it is determined whether or not the damper (brake) current characteristics (a map indicating a relationship between the angular velocity of the steering wheel and the assist current) are to be compiled at Step S26. When the characteristics compilation is needed, the damper current characteristics are compiled at Step S27. When the damper current characteristics are compiled, the endpoints of the damper current characteristics diagram (line graph) displayed on the display D of the personal computer are changed in position by extending or shortening the line by the use of a mouse similarly to FIG. 5.

After the compilation (change) of the damper current characteristics diagram, it is determined whether or not other characteristics relative to steering are to be compiled at Step S23. In the case where the compilation is performed, the program returns to Step S21. At Steps S21, S24 and S26, if the characteristics compilation tends to go out of the specific normal range of change, the disabling means for disabling the compiling operation will operate. Abnormal steering conditions, therefore, can be prevented without an excessive alteration likely to result from the driver's mistake or mis-operation, over the proper range, of the characteristics diagram in relation to steering.

Figure 6:
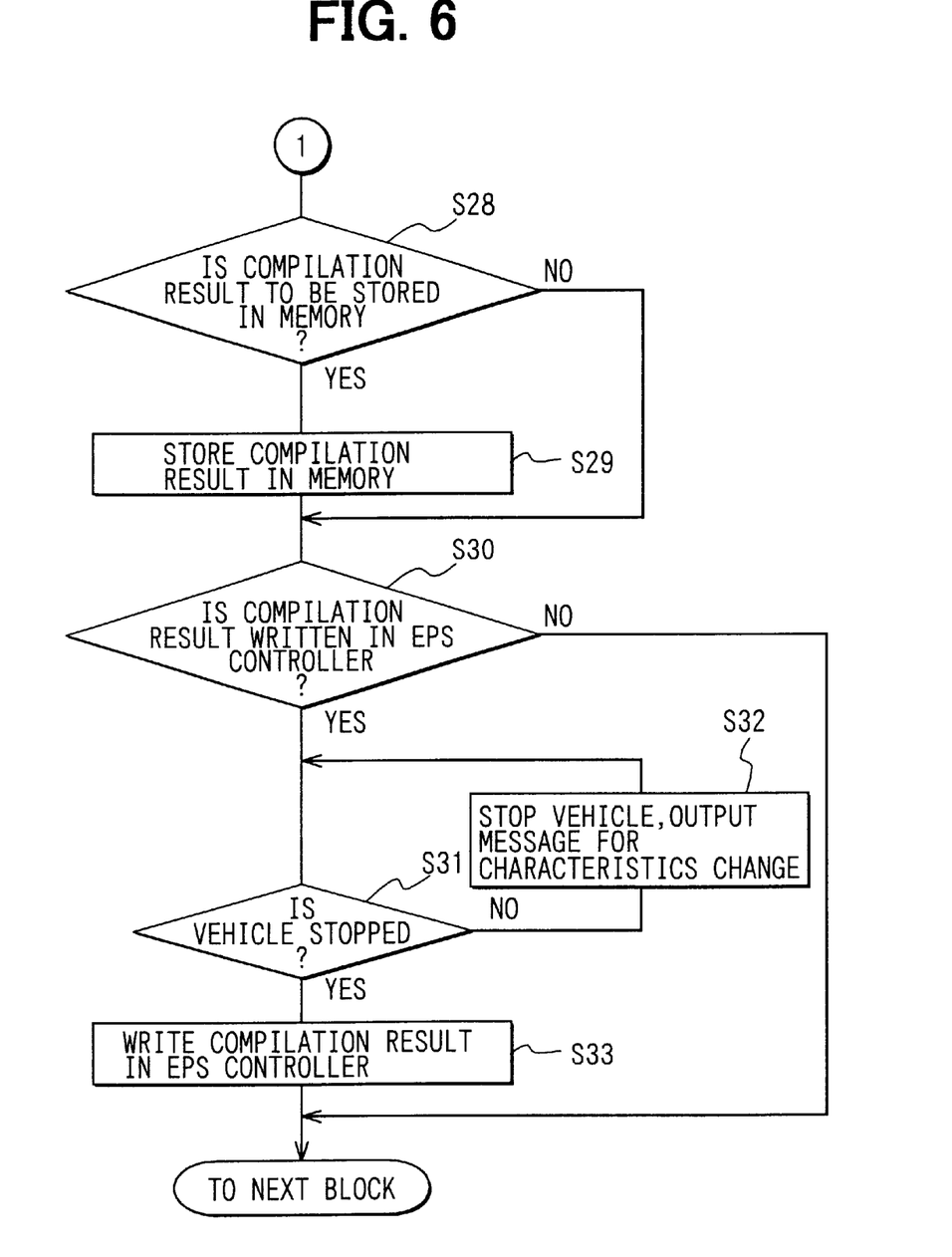
FIG. 6 is a continuation of the flowchart of FIG. 4.

When no compilation of other characteristics relative to steering is performed at Step S23, the program goes to Step S28 shown in FIG. 6. At Step S28, it is decided whether or not a result of compilation of the characteristics is to be stored in a recording medium (storing means) such as a memory or a floppy disk. The result of compilation, when stored, will be stored at Step S29. When the result is not to be stored, the program proceeds to Step S30, where it is determined whether or not the result of compilation is written in the EPS controller 7. If the decision is "No", the program goes to Step S7 in FIG. 2. If the result is written, the program proceeds to Step S31.

At Step S31, whether or not the vehicle is at a stop is decided. If the result of the decision is "No", a message requiring a change in the characteristics relative to steering is sent after stopping the vehicle at Step S32. When the vehicle is at a stop, the result of compilation is written in the EPS controller 7 at Step S33.

The compiled characteristics thus written are read out by the steering characteristics diagram reading means, so that the driver can drive the vehicle with a steering feeling based on the compiled characteristics during driving. The steering characteristics diagram is so compiled that the optimum steering feeling can be visually achieved from the default characteristics at the time of purchase, in accordance with the driver's tastes, tendencies and the driving conditions of the vehicle.

The driver, therefore, can grasp the necessary amount of compilation as an intuitive or sensorial amount while observing the steering characteristics diagram. Therefore, unlike the compilation which requires inputting of every detail of numerical values for theoretical thinking, it is possible for the driver to easily and rapidly reset the steering feelings to diverse steering feelings suited to the driver's individual characteristics. The steering characteristics diagram display means and the steering characteristics diagram compilation means can be installed in other vehicle-mounted products such as a car navigation system and a TV besides the electric power steering system.

Thus installing the steering characteristics diagram display and compilation means can dispense with other special members for the compilation of the steering characteristics diagrams. That is, the existing vehicle-mounted equipment will suffice, requiring no reduction of interior space of the vehicle and accordingly being advantageous with respect to cost.

Furthermore, the steering characteristics diagram display means and the steering characteristics diagram compilation means are capable of two-way communications with the EPS controller 7 of the EPS driving motor 6 by wireless (e.g., UHF or VHF communication) communications equipment. The steering characteristics diagram, therefore, can be remotely controlled in advance for display and compilation from outside the vehicle, e.g., from the driver's home or office.

Furthermore, as the pointing device used in the compilation of the steering characteristics diagram, a track ball, a touch pad or a touch panel, or other device may be used in place of the mouse. Furthermore, the steering characteristics diagram according to this invention is applicable not only to the assist current characteristics, the reverse current characteristics, and the damper current characteristics, but to those which indicate a relationship between the steering feeling and a bank or incline of the running road surface (downhill, uphill, etc.).

Furthermore, it should be understood that various changes and modifications of the steering characteristics diagram may be made without departing from the scope of the present invention so that the diagram can be displayed not only by a two-dimensional map but by a three-dimensional map.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for setting steering characteristics of an electric power steering system, comprising:
   a steering characteristics diagram selection means for selecting a plurality of steering characteristics diagrams prepared in relation with steering conditions;
   a steering characteristics diagram display means for displaying a steering characteristics diagram selected by the steering characteristics diagram selection means;
   a steering characteristics diagram compilation means for compiling while observing the steering characteristics diagram so as to achieve an optimum steering feeling in accordance with a driver's taste and tendencies or running conditions of a vehicle;
   a storage means for storing a steering characteristics diagram thus compiled;
   a steering characteristics diagram reading means for reading the steering characteristic diagram stored in the storage means; and
   an electric power steering driving motor control means for assisting the steering operation according to a driving signal generated on a basis of the steering characteristics diagram thus read.

2. A device for setting steering characteristics of an electric power steering system according to claim 1, wherein the steering characteristics diagram includes a diagram showing a relation between steering torque and assist current, a diagram showing a relationship between a steering angle of a steering wheel and the assist current, and a diagram showing a relationship between the angular velocity of the steering wheel and the assist current.

3. A device for setting steering characteristics of an electric power steering system according to claim 2, wherein the steering characteristics diagram display means is a diagram display screen, and the steering characteristics diagram compilation means is a device capable of compiling the steering characteristics diagram displayed on the diagram display screen by a driver's operation; a device operating the steering characteristics diagram reading means to read the steering characteristics diagram thus compiled.

4. A device for setting steering characteristics of an electric power steering system according to claim 3, wherein the device is a pointing device capable of touching to change a position of endpoints of the steering characteristics diagram displayed on the diagram display screen.

5. A device for setting steering characteristics of an electric power steering system according to claim 4, wherein the pointing device capable of compiling the steering characteristics diagram includes a mouse, a track ball, a touch pad, and a touch panel.

6. A device for setting steering characteristics of an electric power steering system according to claim 2, wherein there is provided a disabling means for disabling compiling operation in case the compilation of the steering characteristics diagram goes out of a specific normal range of compilation.

7. A device for setting steering characteristics of an electric power steering system according to claim 6, wherein the steering characteristics diagram display means and the steering characteristics diagram compilation means are capable of communication with the electric power steering driving motor control means and are installed in vehicle-mounted products excepting the electric power steering system.

8. A device for setting steering characteristics of an electric power steering system according to claim 6, wherein the steering characteristics diagram display means and the steering characteristics diagram compilation means are capable of wireless communication with the electric power steering driving motor control means.

9. A device for setting steering characteristics of an electric power steering system according to claim 3, wherein there is provided a disabling means for disabling compiling operation in case the compilation of the steering characteristics diagram goes out of a specific normal range of compilation.

10. A device for setting steering characteristics of an electric power steering system according to claim 9, wherein the steering characteristics diagram display means and the steering characteristics diagram compilation means are capable of communication with the electric power steering driving motor control means and are installed in vehicle-mounted products excepting the electric power steering system.

11. A device for setting steering characteristics of an electric power steering system according to claim 9, wherein the steering characteristics diagram display means and the steering characteristics diagram compilation means are capable of wireless communication with the electric power steering driving motor control means.

12. A device for setting steering characteristics of an electric power steering system according to claim 1, wherein the steering characteristics diagram display means is a diagram display screen, and the steering characteristics diagram compilation means is a device capable of compiling the steering characteristics diagram displayed on the diagram display screen by a driver's operation; the device operating the steering characteristics diagram reading means to read the steering characteristics diagram thus compiled.

13. A device for setting steering characteristics of an electric power steering system according to claim 12, wherein there is provided a disabling means for disabling compiling operation in case compilation of the steering characteristics diagram goes out of a specific normal range of compilation.

14. A device for setting steering characteristics of an electric power steering system according to claim 13, wherein the steering characteristics diagram display means and the steering characteristics diagram compilation means are capable of communication with the electric power steering driving motor control means and are installed in vehicle-mounted products excepting the electric power steering system.

15. A device for setting steering characteristics of an electric power steering system according to claim 13, wherein the steering characteristics diagram display means and the steering characteristics diagram compilation means are capable of wireless communication with the electric power steering driving motor control means.

16. A method for setting steering characteristics of an electric power steering system, comprising:
  selecting a plurality of steering characteristics diagrams prepared in relation with steering conditions;
  displaying a steering characteristics diagram selected by the steering characteristics diagram selection means;
  compiling on the steering characteristics diagram while observing the steering characteristics diagram so as to achieve the optimum steering feeling in accordance with a driver's taste and tendencies or the running conditions of a vehicle;
  storing the steering characteristics diagram thus compiled;
  reading the steering characteristics diagram stored; and
  controlling an electric power steering driving motor which assists steering operation in accordance with a driving signal generated on the basis of the steering characteristics diagram thus read.

17. A method for setting steering characteristics of an electric power steering system according to claim 16, wherein displaying the steering characteristics diagram includes displaying a diagram having a relationship between steering torque and assist current, displaying a diagram showing a relationship between steering angle of a steering wheel and the assist current, and displaying a diagram showing a relationship between angular velocity of the steering wheel and the assist current.

18. A method for setting steering characteristics of an electric power steering system according to claim 17, wherein displaying the steering characteristics diagram is displaying on a diagram display screen and compiling the steering characteristics diagram is compiling the steering characteristics diagram on the diagram display screen using a driver's operation.

19. A method for setting steering characteristics of an electric power steering system according to claim 18, wherein changing a pointing device position is accomplished by touching an endpoint of the steering characteristics diagram displayed on the diagram display screen.

20. A method for setting steering characteristics of an electric power steering system according to claim 19, wherein using a pointing device capable of compilation of the steering characteristics diagram includes using a mouse, using a track ball, using a touch pad, and using a touch panel.

21. A method for setting steering characteristics of an electric power steering system according to claim 17, wherein disabling the compiling operation of the compilation of the steering characteristics diagram comprises going out of a predetermined normal range of compilation.

22. A method for setting steering characteristics of an electric power steering system according to claim 21, wherein displaying the steering characteristics diagram and compiling the steering characteristics diagram are not performed by the electric power steering system.

23. A method for setting steering characteristics of an electric power steering system according to claim 21, wherein displaying the steering characteristics diagram and compiling the steering characteristics diagram are performed by wirelessly communicating with an electric power steering driving motor control means.

24. A method for setting steering characteristics of an electric power steering system according to claim 18, wherein disabling the compiling operation is accomplished in case compilation of the steering characteristics diagram goes out of the predetermined normal range of compilation.

25. A method for setting steering characteristics of an electric power steering system according to claim 24, wherein displaying the steering characteristics diagram and compiling the steering characteristics diagram are not performed by the electric power steering system.

26. A method for setting steering characteristics of an electric power steering system according to claim 24, wherein displaying the steering characteristics diagram and compiling the steering characteristics diagram are performed by wirelessly communicating with an electric power steering driving motor control means.

27. A method for setting steering characteristics of an electric power steering system according to claim 16, wherein displaying the steering characteristics diagram is accomplished on a diagram display screen and compiling the steering characteristics diagram is compiling the steering characteristics diagram on the diagram display screen according to a driver's operation.

28. A method for setting steering characteristics of an electric power steering system according to claim 27, wherein disabling the compiling operation is accomplished in case compilation of the steering characteristics diagram goes out of the predetermined normal range of compilation.

29. A method for setting steering characteristics of an electric power steering system according to claim 28, wherein displaying the steering characteristics diagram and compiling the steering characteristics diagram are not performed by the electric power steering system.

30. A method for setting steering characteristics of an electric power steering system according to claim 28, wherein displaying the steering characteristics diagram and compiling the steering characteristics diagram are performed by wirelessly communicating with an electric power steering driving motor control means.

* * * * *